Feb. 11, 1947.    W. H. WARD    2,415,570
WEIGHING SCALE
Filed May 1, 1944    2 Sheets-Sheet 1
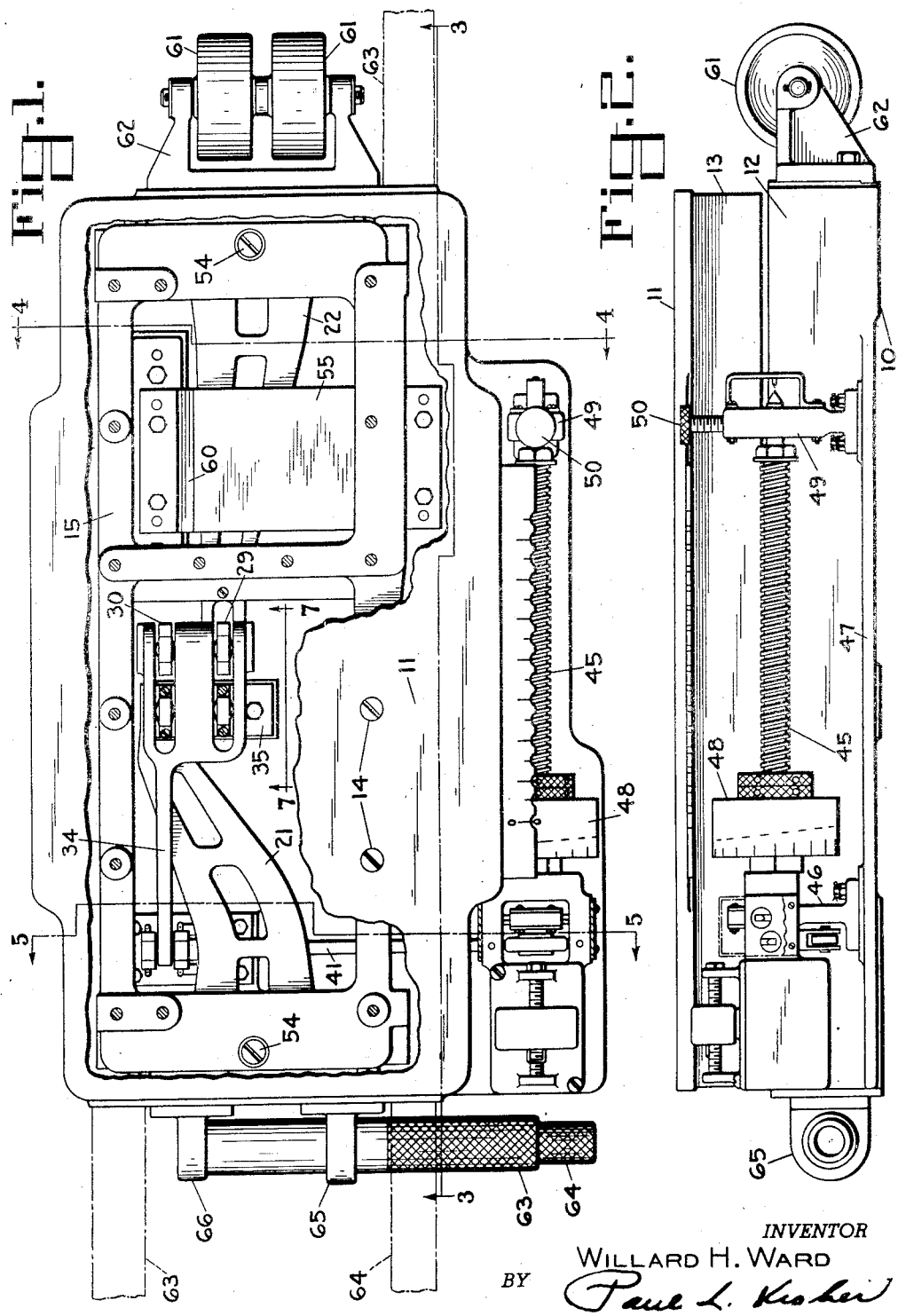
INVENTOR
WILLARD H. WARD
BY
Paul L. Kisher
ATTORNEY

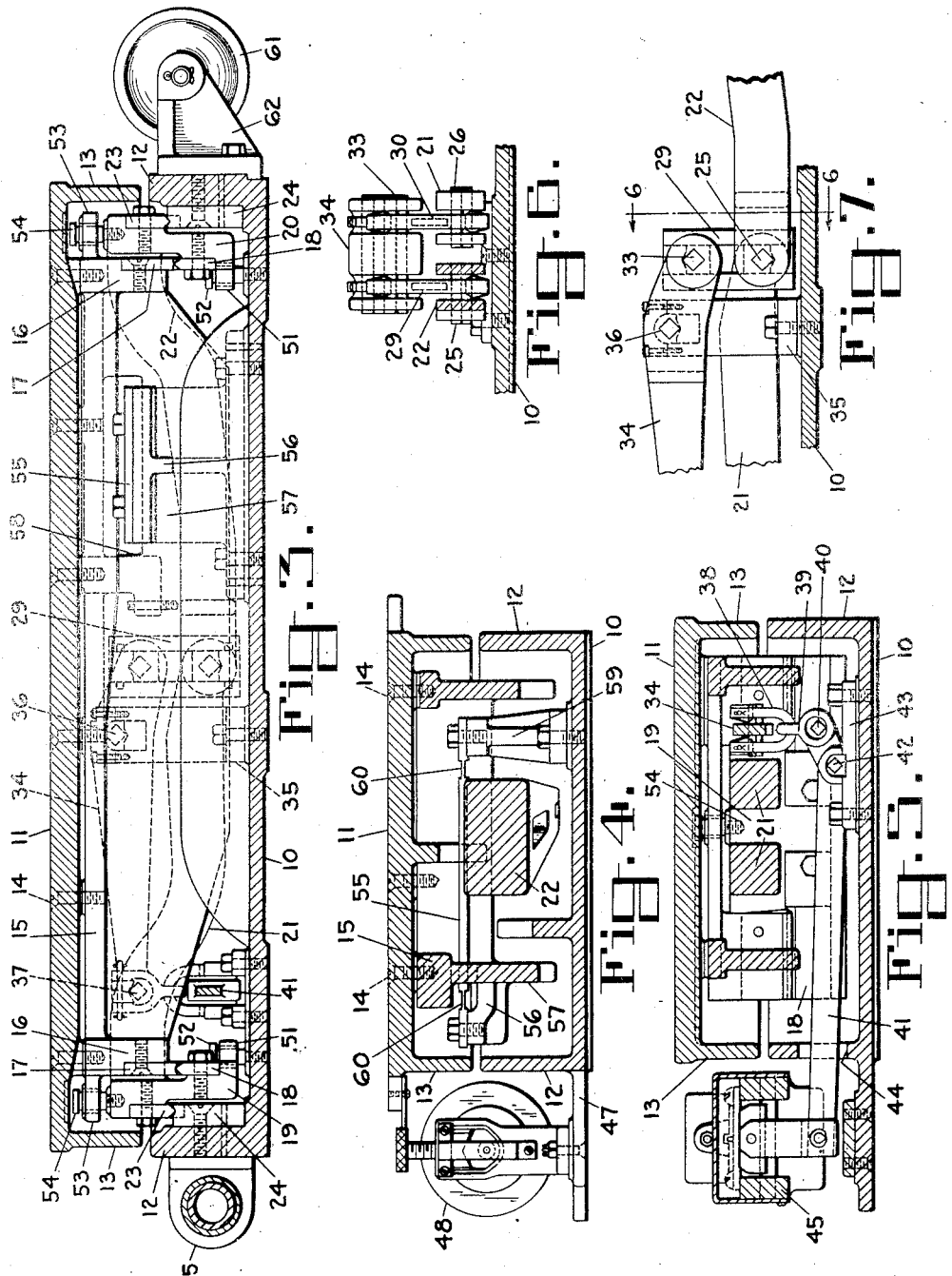

Patented Feb. 11, 1947

2,415,570

UNITED STATES PATENT OFFICE 2,415,570

WEIGHING SCALE

Willard H. Ward, St. Johnsbury, Vt., assignor to Fairbanks, Morse & Co., Chicago, Ill., a corporation of Illinois Application May 1, 1944, Serial No. 533,505

8 Claims. (Cl. 265—71)

This invention relates to weighing scales and has particular reference to an improved heavy-duty, portable, platform type scale.

The scale of the present invention has special application for determining the weight of airplanes, and for use in connection with the loading of airplanes to assure a proper balanced distribution of the cargo weight. A scale for this purpose should be relatively small and compact to enable it to be easily moved from one location to another, and so that it can be readily manipulated into position below the understructure of the plane. It should have high weighing capacity and be of sturdy construction, since a portable scale of this character is ordinarily subjected to much rough handling. The principal object of the present invention is to provide an improved scale having these features and characteristics.

More specifically, an object of the invention is to provide a compact lever system for a heavy-duty portable scale, such that the system is adapted to be installed in a casing or housing structure which is extremely small as compared to former scales of comparable weighing capacity. This object is achieved by the novel form and construction of levers, the manner in which their fulcrum- and load-bearings are arranged thereon, as well as by the improved disposition and relative arrangement of the levers in the base housing of the scale.

Other objects and improvements are attained in novel provisions for checking and restraining the scale members from becoming dislocated under the influence of abnormal or irregular forces, and for maintaining the parts in assembled relation.

These and other objects and advantages will be explained in the following description of an operative embodiment of the invention. In the drawings thereof:

Fig. 1 is a top plan view of the weighing scale, the scale platform of which is partly broken away to show the parts within the scale housing;

Fig. 2 is a side view of the exterior of the scale;

Fig. 3 is a longitudinal sectional view taken on line 3—3 of Fig. 1 showing the lever system and checking mechanism and their appurtenant parts;

Fig. 4 is a cross-section of the scale showing particularly the horizontal plate checking device, the view being taken on line 4—4 of Fig. 1;

Fig. 5 is a cross-section taken on line 5—5 of Fig. 1 and showing clearly the extension or tertiary lever and its connections; and Figs. 6 and 7 are end and side views respectively of the center connection and the fulcrum pivotal arrangement of the multiple lever, Fig. 6 being taken on line 6—6 of Fig. 7.

Referring now by characters of reference to the drawings, the scale mechanism is for the most part housed within a low, substantially flat housing structure having relatively movable lower and upper complementary sections 10 and 11, hereafter referred to as the base and platform members respectively. The side and end walls of the housing structure are constituted by upstanding marginal flanges 12 on the base member, and by depending marginal flanges 13 on the platform member. The platform is mounted on and rigidly secured by bolts 14 to a supporting spider 15 having transverse end members 16 to each of which is bolted a pair of bearing blocks 17 (Fig. 3). The blocks 17 are mounted at the ends of the transverse members 16 so that a bearing support is provided near each of the four corners of the platform. V-grooves in the lower surfaces of bearing blocks 17 receive and pivotally seat upon the knife-edged upper ends of pivot blocks 18, these being arranged in pairs and secured against the inner sides of transversely extending fulcrum end portions 19 and 20 of primary levers 21 and 22 respectively. The transverse end portions 19, 20 have pairs of fulcrum bearing steels 23 secured against their opposite or outer sides adjacent the ends thereof, the downwardly directed knife-edged ends of said bearing steels pivotally seating in V-grooves formed in the upper surfaces of fulcrum bearing blocks 24 which are secured by screws to the inner faces of base end flanges 12.

As will appear from Fig. 1, the primary levers 21, 22 are of massive, truss-like form. The longitudinal arm portions thereof merge from the central regions of the transverse end portions, and curve downwardly and laterally so that for the most part said arm portions are disposed in the lower half of the housing structure. The inner or tip ends of the primary levers are arranged in side-by-side relation near the center of the housing, but offset to one side thereof. Their bifurcated ends are traversed by aligned knife-edge pivot elements 25 and 26 (Figs. 6 and 7) whose lower bearing edges seat in the grooves of bearing blocks carried at the lower ends of individual vertical link members 29 and 30. The said link members have bearing blocks near their upper ends by which they are suspended from a common pivot element 33 that extends transversely through the dual-slotted end of a so-called secondary lever 34. As will appear from Fig. 1, the fulcrum or butt end of the secondary lever 34 has what may be termed a compound fulcrum assumbel and is supported on a stand 35, bolted to the floor of the housing base section, having two upstanding arms arranged in the planes of the link members 29, 30. These members carry fulcrum bearing blocks whose V-grooves receive the ends of a fulcrum pivot element 36. The secondary lever 34 extends longitudinally in the upper part of the housing structure above the depressed tip end portion of primary lever 21. A pivot element 37 at the tip of the secondary lever 34 receives bearing blocks which are pivotally mounted for self-adjustment on a loop or inverted saddle member 38, with which is linked a bearing loop 39. The bearing arms of loop 39 receive a pivot element 40 carried by a tertiary or extension lever 41 which extends transversely of the housing structure below and crosswise of the primary lever 21. A fulcrum pivot 42 for lever 41 seats upwardly aginst the bearing surfaces of the loops of a fulcrum stay 43 which is secured by bolts to the floor of the base section.

The tertiary lever projects through an opening 44 (Fig. 5) in the side flange of the base section and is pivotally connected at its end to a longitudinal lever 45 which constitutes the weigh beam of the scale mechanism. The weigh beam is supported by a fulcrum stand 46 which is secured to a forwardly projecting ledge or shell 47 on the outside of the base section.

The weigh beam and its appurtenances are preferably of the character shown and fully described in the patent to A. Bousfield No. 1,797,852, of March 24, 1931, and includes an externally threaded arm on which is mounted a poise 48, the latter being screw-threaded on the beam arm and adapted to be rotatable to effect its advancement along the beam. A trig stand 49 has means 50 for locking or immobilizing the beam.

From the foregoing description it will be understood that a load on the platform is transmitted through the bearing blocks 17 on spider 15 to the main levers 21, 22, the load force tending to depress the tip ends of the primary levers. A downward force is thus imparted through vertical links 29, 30 to the butt end of secondary lever 34, which transmits an upward force to the butt end of the transverse or tertiary lever 41. The lever 41, in turn, produces a downward force on the butt end of the weigh beam 45, which is adapted to be balanced by the poise 48.

Describing now the improved provision for yieldably interconnecting the base and platform sections of the scale housing, and for retaining the platform and primary lever bearings in place, it will appear, particularly in Fig. 3, that the transverse end parts 19 and 20 of the primary levers have short flange-like projections 51 extending along the lower, inner margins thereof. The projections 51 are provided with openings to receive headed retainer studs 52 which are screwed or otherwise tightly secured to the floor of the base section. Studs 52 pass through the openings in the projections 51 with sufficient clearance when the scale is in its normal operating position so that there is no contact between the parts at these points and normal pivotal action of the levers is not interfered with. The described provisions, however, effectively prevent unseating or dislodgment of the primary levers from their bearing seats, such as might otherwise result from inverting or jarring the scale.

A similar type of loose connections is provided between the main levers and the platform section of the base housing. Thus flange-like projections 53 on the transverse end members of platform spider 15 extend above the transverse ends of the main levers. These projections are provided with suitable apertures through which extend, with ample clearance, headed retainer studs 54, these being screwed in the main levers as shown. The retainer studs 54 connect the platform and spider assembly to the main levers and prevent dislocation of the platform bearings 17 from the main lever bearing steels 18. It will thus appear that the platform and base sections of the housing are loosely interconnected by the transverse end portions of the main levers.

As means for preventing lateral relative displacement of the platform and base sections a flexible connection between these parts is provided in the form of a rectangular plate 55 that extends in a plane parallel to the plane of the platform. One end of the plate 55 is rigidly fastened to a bracket 56 (Fig. 4) projecting from the outer side of a longitudinal reenforcing rib 57 on the platform spider 15. Plate 55 passes through an opening 58 in rib 57 and extends across to the opposite side of the housing where it is fastened at its end to the top of a stand 59, this stand being securely anchored to the base floor. Plate 55 has grooves 60 that extend in parallel and adjacent to its secured ends, by which there is produced relatively thin necks of metal that increase the yieldability of the plate to forces acting on its ends, normal to the plane thereof. The resistance which the plate offers to platform deflection is practically negligible, yet the plate strongly resists all forces that tend to move one of the sections laterally with respect to the other.

To facilitate transporting the scale there is provided, at one end of the base housing, a pair of rollers or casters 61. These are mounted on a shaft between the arms of U-bracket 62 which is secured, as by bolts, to the end flange 12 of base section 10. At the opposite end of the base housing there is provided a pair of handles 63 and 64. In Fig. 1 the representation of the handles in full lines illustrates a preferred manner of mounting them on the scale when they are not in actual service. Handle 63 is by preference a tube which is adapted to accommodate therein the handle 64. The telescoped assembly is shown extending through an opening in an ear or lug 65, handle 63 being end-threaded in a tapped hole in a companion lug 66, the lugs 65 and 66 being fastened to or formed integral with the end flange 12 of base section 10.

There are two ways in which the handles 63, 64 may be employed. One of these is to thread the handles in tapped openings formed in the end flange 12 of the base section, so that they will appear as indicated by dotted line showings at the left end of the scale assembly, Fig. 1.

When so disposed the scale is adapted to be wheeled on its casters 61 from one place to another in the manner of a wheelbarrow. In the second method one of the handles is end-threaded in a tapped hole in the opposite end flange so that the handles will be aligned near one side of the assembly, an arrangement also indicated by broken lines, Fig. 1. This arrangement facilitates transporting the scale by two men, sometimes necessary because of soft ground conditions which preclude satisfactory wheeling of the scale.

From the foregoing description it will appear that I have provided a sturdy, extremely compact scale which is adapted for heavy-duty service and is easily transported.

What I claim and desire to secure by Letters Patent is:

1. In a weighing scale, a base member, a load-receiving platform, a lever system on said base member comprising a longitudinal primary lever formed and arranged to have its tip end disposed in a plane below its butt end, a longitudinal secondary lever having its butt end overlying and linked to the tip end of said primary lever and its tip disposed at one side of said primary lever and directed toward the butt end thereof, a transverse tertiary lever crossing below the butt end of said primary lever and having its butt end underlying and linked to the tip end of said secondary lever, and a longitudinal weigh beam lever connected at its butt end to the tip of said tertiary lever.

2. In a weighing scale, a housing structure including a platform, a primary lever extending longitudinally within the housing structure, connected in supporting relation to said platform, said primary lever having a bend therein such that its butt end is disposed in a plane above its tip end, a secondary lever extending longitudinally within the housing structure in substantially the plane of the butt end of said primary lever, a vertical link interconnecting the tip end of said primary lever to the butt end of said secondary lever, a tertiary lever extending transversely of and below said primary and secondary levers, a vertical link interconnecting the tip end of said secondary lever to the butt end of said tertiary lever, said tertiary lever projecting through an opening in the side wall of the housing structure, a longitudinal weigh beam mounted outside the housing structure, and a vertical link connecting the tip end of said tertiary lever to the butt end of said weigh beam.

3. In a portable platform scale, a relatively low, flat housing surmounted by a platform, a lever system including a longitudinal primary lever within the housing, connected in supporting relation to said platform, said primary lever being fulcrumed adjacent one end of the housing and having a longitudinal bend therein, the tip end of said primary lever being disposed in the lower portion and near one side of the housing; a longitudinal secondary lever having its butt end overlying the tip end of said primary lever, vertical link means connecting the tip and butt ends of said primary and secondary levers respectively, a transverse tertiary lever extending below said primary lever and operatively connected to said secondary lever, said tertiary lever projecting outwardly of the housing through a side wall opening therein, and a longitudinal weigh-beam lever connected to said tertiary lever and extending along the outer side of said housing.

4. In a platform scale of the character described, a base, a platform, a pair of longitudinally extending main levers fulcrumed at their outer ends on bearings disposed at opposite ends of said base, platform supporting bearings engaging the main levers at points thereon inwardly of said fulcrum bearings, a longitudinal secondary lever fulcrumed intermediate its ends on a base-supported bearing, means linking the tip ends of said main levers to the butt end of said secondary lever, a tertiary lever extending transversely of the base below said main and secondary lever, said tertiary lever having its butt end connected to the tip end of said secondary lever, and a longitudinal weigh beam lever connected to said tertiary lever.

5. In a portable platform scale, a relatively low, flat housing surmounted by a load-receiving platform, a pair of primary, platform-supporting levers fulcrumed at their butt ends to opposite ends of the housing and extending longitudinally thereof and having their tip portions disposed in lateral relation, said primary levers being bent and having their butt-ends disposed in the upper portion of the housing and their tip ends disposed in the lower portion of the housing, a longitudinal secondary lever disposed in the upper portion of the housing, a pair of vertical links, each connecting the tip of one primary lever to the butt end of said secondary lever, a tertiary lever extending transversely within the housing, near one end thereof, crossing underneath one of said primary levers and the secondary lever, a vertical link connecting the tip and butt ends of said secondary and tertiary levers respectively, said tertiary lever projecting outwardly of the housing through a side wall opening therein, and a weigh beam lever connected to said tertiary lever extending along the outer side of said housing.

6. In a portable scale, a base housing including a load-receiving platform, a pair of platform-supporting primary levers extending longitudinally inwardly from near opposite ends of the housing, said primary levers having transverse butt end portions, fulcrum bearings secured to the outer side face of each said butt end portion, and load bearings secured to the inner side face thereof, a longitudinal secondary lever having its butt end overlying the tips of said primary levers, means connecting the tips of said primary levers individually to the butt end of said secondary lever, a longitudinal weigh-beam on the outside of said base housing, and a transverse lever extending through a side opening in the base housing, interconnecting the tip of said secondary lever to the butt end of said weigh-beam.

7. In a platform scale, a base housing, a pair of platform-supporting levers extending longitudinally in opposed tandem relation in said housing, said levers having transverse butt end portions adjacent opposite ends of said housing, paired fulcrum bearings secured to the outer sides, and paired load bearings secured to the inner sides of said butt end portions, a longitudinal secondary lever overlying said primary levers, vertical link elements individually connecting the tips of said primary levers to the butt end of said secondary lever, a transverse tertiary lever adjacent the butt end portion of one of said primary levers, and a longitudinal weigh-beam operatively connected to said tertiary lever.

8. A portable, platform-type scale comprising a base housing including a platform member, fulcrum bearing blocks secured to opposite end walls of the base housing, a pair of primary levers disposed in opposed tandem relation, longitudinally within the base housing, said primary levers having transverse butt end portions, bearings coacting with said fulcrum bearing blocks and mounted on the outer sides of said end portions, load bearings secured against the inner sides of said transverse end portions, bearing means depending from said platform, coacting with said load bearings, said primary levers being formed and arranged to have their tip ends disposed in lateral relation near the center and adjacent one side of the base housing, a secondary lever extending longitudinally near one side of the base housing with its butt end above the tips of said primary levers, means connecting said primary levers individually to the butt end of said secondary lever, a transverse tertiary lever crossing underneath one of said primary levers, a vertical link means interconnecting said secondary and tertiary levers, said tertiary lever projecting outwardly through a side opening in the base housing, and a longitudinal weigh beam disposed externally of the base housing, connected to said tertiary lever.

WILLARD H. WARD.

REFERENCES CITED

The following references are of record in the file of this patent:

UNITED STATES PATENTS

| Number | Name | Date |
|---|---|---|
| 278,904 | Emery | June 5, 1883 |
| 1,797,852 | Bousfield | Mar. 24, 1931 |
| 1,917,080 | Aihara | July 4, 1933 |
| 1,980,609 | Bousfield | Nov. 13, 1934 |
| 2,224,327 | Weber, et al. | Dec. 10, 1940 |
| 336,472 | Craig | Feb. 16, 1886 |
| 524,266 | Paddock | Aug. 7, 1894 |
| 1,271,497 | Zimmerman | July 2, 1918 |

FOREIGN PATENTS

| Number | Country | Date |
|---|---|---|
| 695,115 | French | Sept. 23, 1930 |